United States Patent
Pu et al.

(10) Patent No.: US 12,423,294 B2
(45) Date of Patent: Sep. 23, 2025

(54) METHODS AND SYSTEMS OF VERIFYING DATA SYNCHRONIZED TO MULTIPLE DATA STORES

(71) Applicant: Microsoft Technology Licensing, LLC, Redmond, WA (US)

(72) Inventors: Shi Pu, Kirkland, WA (US); Shruti Kasetty, Bellevue, WA (US); Anish Agarwal, Bothell, WA (US); Hao Xie, Redmond, WA (US); Abhishek Kadian, Jersey City, NJ (US); Umme Salma Shabbir Gadriwala, Seattle, WA (US); Carly Larsson, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/176,772

(22) Filed: Mar. 1, 2023

(65) Prior Publication Data
US 2024/0296155 A1 Sep. 5, 2024

(51) Int. Cl.
*G06F 15/16* (2006.01)
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 10,684,998 B2 * | 6/2020 | Ardila | G06F 16/211 |
| 2007/0156842 A1 | 7/2007 | Vermeulen et al. | |
| 2014/0074700 A1 * | 3/2014 | Smith | G06Q 20/023 705/39 |
| 2014/0129513 A1 * | 5/2014 | Cheang | G06F 16/2358 707/609 |
| 2014/0195482 A1 | 7/2014 | Kaiser | |
| 2016/0147449 A1 * | 5/2016 | Andrei | G06F 16/2308 707/814 |
| 2017/0185488 A1 | 6/2017 | Kumarasamy | |
| 2019/0073284 A1 * | 3/2019 | Anderson | G06F 11/1625 |

OTHER PUBLICATIONS

International Search Report and Written Opinion received for PCT Application No. PCT/US2024/017369, Jun. 17, 2024, 14 pages.

* cited by examiner

*Primary Examiner* — Alex Gofman
(74) *Attorney, Agent, or Firm* — Han Gim; Newport IP, LLC

(57) ABSTRACT

A data verification agent serves to verify data that is being redundantly stored in both a first data store and a second data store. The data verification agent compares corresponding objects in the first and second data stores to determine any mismatch between the objects. The data verification agent includes a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

17 Claims, 12 Drawing Sheets

METHODS AND SYSTEMS OF VERIFYING DATA SYNCHRONIZED TO MULTIPLE DATA STORES

BACKGROUND

The importance of electronic data cannot be overstated. Many organizations would be unable to function without the electronic records of their work that are constantly being generated. Because of the criticality of such data, it is important to ensure that the data is safely and accurately stored so as to be available when needed. This often entails making backup copies of the data so that, if something happens to one data set, the backup data set can be accessed with no loss of time or productivity.

In some systems, data is simultaneously recorded in multiple data stores as it is being created or updated. In such a system, a mechanism is needed to verify that the data accurately matches between the two data stores. This can be challenging if the data is being updated in real-time for both data stores. Consequently, there is a need for an improved system to verify the integrity of data being kept in multiple data stores and that the data matches between the different stores.

SUMMARY

In one general aspect, the instant disclosure presents a data verification agent that serves to verify data that is being redundantly stored in both a first data store and a second data store. The data verification agent compares corresponding objects in the first and second data stores to determine any mismatch between the objects. The data verification agent includes a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

In another aspect the instant disclosure presents a non-transitory computer-readable medium comprising instructions for a processor, the instructions, when executed by the processor, causing the processor to implement: a data verification agent to verify data that is being redundantly stored in both a first data store and a second data store, the data verification agent to compare corresponding objects in the first and second data stores to determine any mismatch between the objects; the data verification agent comprising a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

In another aspect the instant disclosure presents a method of verifying data being redundantly stored in both a first data store and a second data store while limiting false positive indications of data mismatch, the method comprising: operating a data verification agent to compare corresponding objects in the first and second data stores to determine any mismatch between the objects; and skipping a comparison of corresponding data objects in the first and second data stores in response to an indication that a mismatch between the objects would not necessarily indicate a synchronization failure so as to minimize false positive determinations of a synchronization failure.

In another aspect the instant disclosure presents a non-transitory computer-readable medium comprising instructions for a processor, the instructions, when executed by the processor, causing the processor to implement: a data verification agent to verify data that is being redundantly stored in both a first data store and a second data store, the data verification agent to compare corresponding objects in the first and second data stores to determine any mismatch between the objects. The data verification agent further provides synchronization verification on a per service basis, the data verification agent receiving selection of a specific service for which to verify data synchronization; the data verification agent sampling corresponding objects in the first and second data stores that have a timestamp by the selected service within a specified time range; and the data verification agent reporting mismatches between the objects of the first and second data stores that have a timestamp by the selected service within the specified time range.

In another aspect the instant disclosure presents a non-transitory computer-readable medium comprising instructions for a processor, the instructions, when executed by the processor, causing the processor to implement a data verification agent to verify data that is being redundantly stored in both a first data store and a second data store, the data verification agent to compare corresponding objects in the first and second data stores to determine any mismatch between the objects. The data verification agent: applies a mapping layer to the corresponding objects from the first and second data stores when the first and second data stores are organized by different schema, the mapping layer producing mapped objects based on the data and properties of the objects from the first and second data stores; and compares the mapped objects for any mismatch.

In another aspect the instant disclosure presents a non-transitory computer-readable medium comprising instructions for a processor, the instructions, when executed by the processor, causing the processor to implement: a data verification agent to verify data that is being redundantly stored in both a first data store and a second data store, the data verification agent to compare corresponding objects in the first and second data stores to determine any mismatch between the objects. The data verification agent further confirms synchronous deletion of objects between the first and second data stores when the data verification agent does not have privileges for the second data store; the data verification agent to compare a tombstone object from the first data store with a corresponding empty result from the second data store; and the data verification agent to report a mismatch if the second data store does not return the empty result corresponding to the tombstone object from the first data store.

In another aspect the instant disclosure presents a non-transitory computer-readable medium comprising instructions for a processor, the instructions, when executed by the processor, causing the processor to implement: a data verification agent to verify data that is being redundantly stored in both a first data store and a second data store, the data verification agent to compare corresponding objects in the first and second data stores to determine any mismatch between the objects. The data verification agent performs data verification in a series of iterations, the data verification agent having a list of sensitive data objects which are sampled for possible mismatches between the first and second data stores in every iteration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
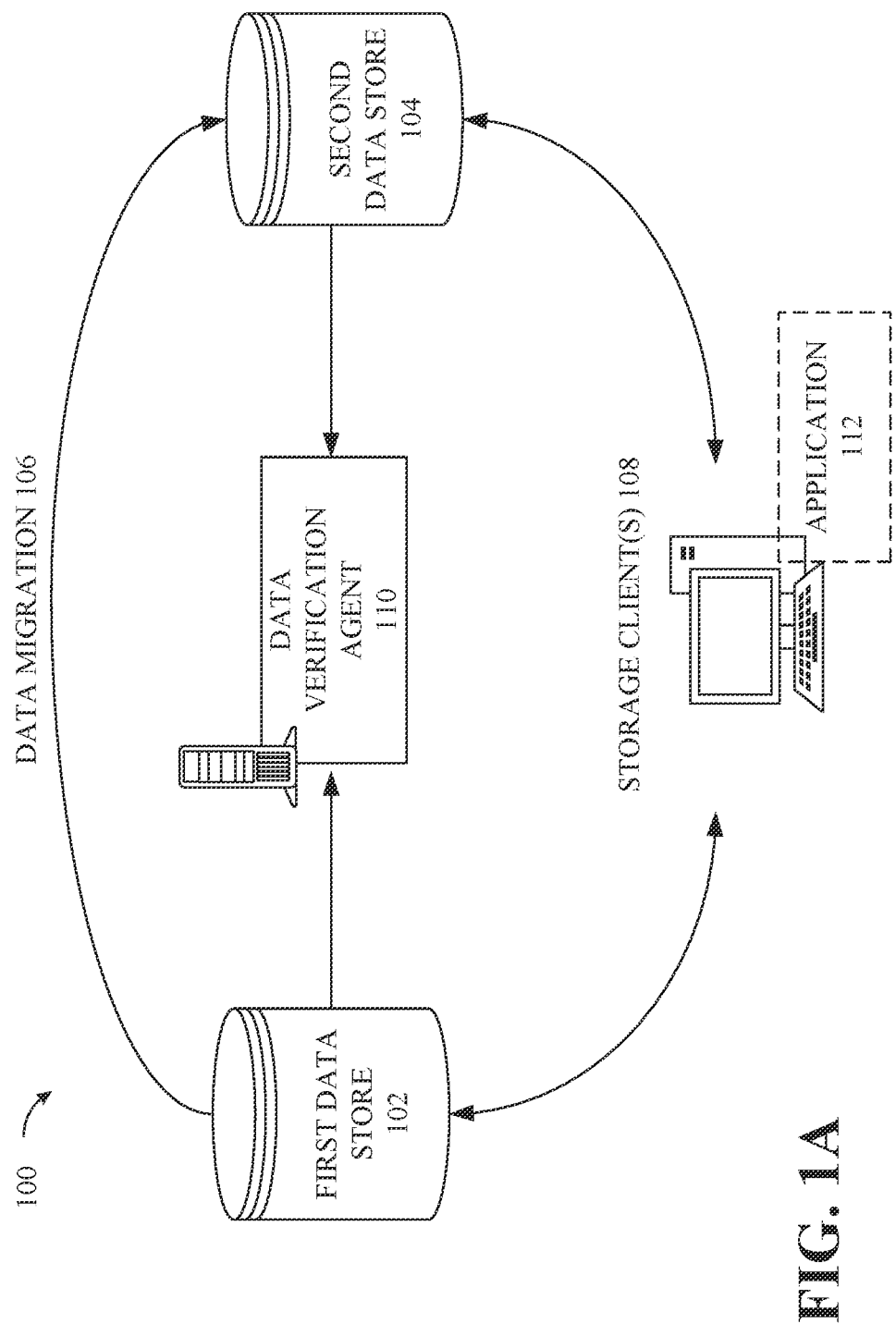
FIG. 1A depicts an example system for verification of data across multiple data stores and upon which aspects of this disclosure may be implemented.

As noted above, in some systems, data is simultaneously recorded in multiple data stores as it is being created or updated. In such a system, a mechanism is needed to verify that the data accurately matches between the two data stores. This can be challenging if the data is being updated in real-time for both data stores. One issue is when the indication of a mismatch in the data between the two stores is not actually a failure to synchronize the data. This is referred to as a false positive mismatch.

For example, one data store may simply be slower at receiving or implementing a data change than the other data store. Consequently, there may be an apparent mismatch in the data between the two stores which is merely a transient state that will be remediated shortly in the normal course of operations and does not require any concern or attention. The systems and methods described in this specification provide mechanisms to limit indications of such false positive mismatches and address other issues to improve the verification of data being accurately synchronized across multiple data stores.

As used in the present specification and claims, the term "data store" refers to any location or device for storing electronic data for later use. A data store is a physical or virtual location where data is stored. Conceptually, some examples of data stores include. (1) Relational databases. Relational databases are the most common type of data store. They organize data into tables with rows and columns, and use Structured Query Language (SQL) to query and manage the data. (2) NoSQL databases: NoSQL databases are non-relational databases that store data in a more flexible way. They can handle large amounts of unstructured or semi-structured data, and are designed to scale horizontally. (3) File systems: File systems are a way of organizing data on disk. They store files and folders in a hierarchical structure, and can be used for storing a variety of data types (4) Object stores: Object stores are designed for storing unstructured data. Physically, a data store exists on a memory device such as a hard drive, solid state drive, disk array, redundant array of independent disks (RAID) and the like. Other physical memory devices include USB flash drives, memory cards, optical drives (e.g., CD/DVD/Blu-ray), tape drives, and cloud storage services.

As used in the present specification and claims, the term "object" refers to any unit of stored data in a first data store that is verified against a corresponding data unit in a second data store.

As used in the present specification and claims, the term "data verification agent" refers to an agent stored or executing in an electronic environment for conducting verification of corresponding objects stored in different data stores. Typically, the data verification agent will operate in a batched mode. For example, a data verification agent may sample objects in batches, such as 100 objects for each object type in one iteration. The data verification agent then compares each pair of corresponding the objects. When a mismatch is found, a mismatch log for that specific object will be created. At the end of an iteration, the data verification agent can log the metrics for the whole iteration such as the number objects checked and the number of objects that have mismatches. These number may also be presented as percentages.

FIG. 1A depicts an example system for verification of data across multiple data stores and upon which aspects of this disclosure may be implemented. As shown in FIG. 1A, there may be one or more storage clients 108 that are generating electronic data and updating that data regularly. The security and availability of this data to the storage client may be extremely important. Accordingly, the data is maintained as multiple backup copies respectively in each of a first data store 102 and a second data store 104. The data stores may be maintained in different physical locations and may be within a same local network as the storage client 108. Alternatively, the data stores may be cloud resources with which the storage client communicates over the internet or other wide area network.

A data verification agent 110 is described herein to verify the accuracy and integrity of the synchronized data by comparing the data stored in the first and second data stores. If the data in one data store does not match the corresponding data in the other data store, this may indicate an error in the process of synchronizing the data. As shown in FIG. 1A, the data verification agent 110 may be resident or executing on a server that has access to both of the data stores. This server may be part of the same local network as the data stores and the storage client or may communicate with the data stores and storage client over the Internet or other wide area network.

The storage client 108 is executing one or more applications 112. The operation of the application 112 may be utilizing data from the data stores and/or generating data to be recorded in the data stores. The operations of the data synchronization and the data verification can occur without interrupting the operation, data consumption or data production of the application 112.

There may be two different stages in the operation of the system shown in FIG. 1A. When a second data store 104 is first implemented to back up the data, there will need to be a data migration 106 of a copy of all the data from the first data store 102 to the second 104. This is referred to as the first stage or the initial data migration. The second stage occurs when a copy of data exists in both data stores and both copies are being updated in real-time. This is referred to as the dual store mode. Both stages should occur with minimum impact to the end-user of the software application 112, i.e., the read/write processes should continue to work seamlessly.

In the initial data migration stage, the first data store 102 continues to process read and write requests. Consequently, the second data store 104 needs to be caught up with the most recent changes written to first data store 102. In the dual store mode or stage, new plumbing from the readers and writers of the storage client(s) 108 is activated with data traffic being routed to both data stores. In some cases, the first data store is to be retired and data traffic to the first data store 102 may be gradually concluded. However, for a redundant storage system, data traffic will continue to both data stores after the initial migration.

During the initial data migration, a data verification process is introduced to validate data integrity and ensure that the functions of the software application 112 remain unaffected by the data migration. This data verification continues once the dual store mode is reached. In all cases the data verification has the following objectives: (1) Completeness—all data that exists in first data store is present in the second data store. Also, as all data that is absent or deleted from the first data store is also absent or deleted from the second data store. (2) Accuracy—all data between the two stores should have the same, matching values.

Some challenges when verifying data completeness and accuracy between the two data stores are: (1) Variations in organization and schema of the data properties between the data stores. The same set of data properties could be stored and/or retrieved differently in the two data stores. (2) Migration Delay: During data migration, the second data store may be behind the first data store because there could be changes to the data set that have not yet been fully synchronized. Thus, missing data in the second data store does not necessarily indicate a problem. More specifically, during data migration, the second data store 104 may rely on the first data store 102 to forward all changes from the storage client 108. Therefore, there will always be discrepancies between the data stores until the first data store 102 is able to transfer all its data, including data changes, to the second data store 104. (3) Writing Delay: In dual store mode, while both stores receive the same set of changes from the client(s) 112, those data changes may not be applied at the same time. Thus, writes could be delivered and applied to the two data stores in random order and time. Only eventual consistency is provided. Accordingly, the data verification agent described herein addresses these challenges.

Figure 1B:
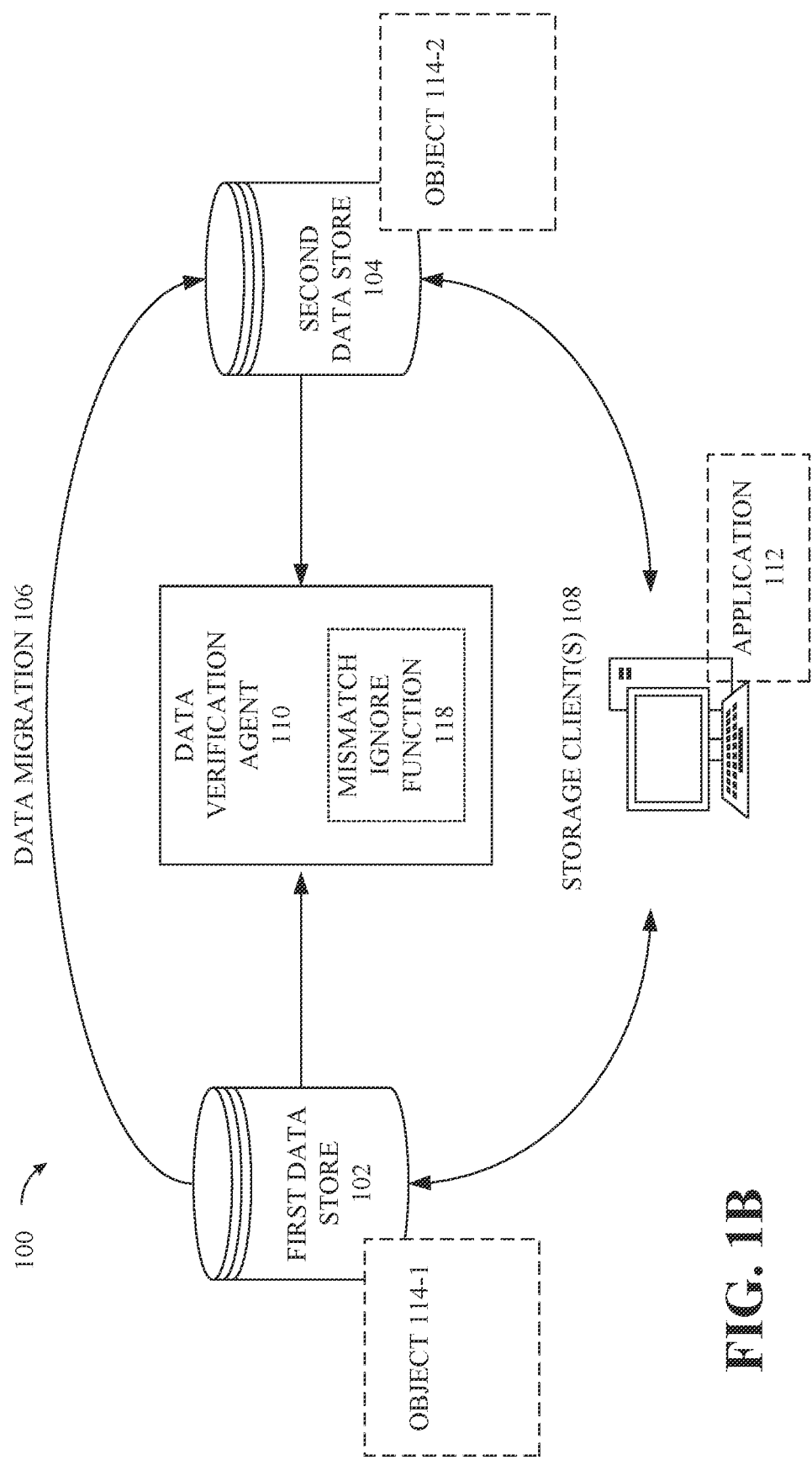
FIG. 1B depicts additional details in the illustrative system of FIG. 1A upon which aspects of this disclosure may be implemented.

FIG. 1B depicts additional details in the illustrative system of FIG. 1A upon which aspects of this disclosure may be implemented. As shown in FIG. 1B, the data verification agent 110 will generally compare a first data object 114-1 from the first data store 102 to a corresponding data object 114-2 from the second data store 104. If the data objects 114 match, the data synchronization is verified as to the data and properties of those objects. If the data objects do not match, this may indicate a synchronization failure or may simply be an effect of the issues described above that will resolve in time without further attention.

This comparison of objects between different stores may include comparing the data and all the properties of each object with those of the other. For example, a data object may have specified relationships with other objects in the data store. This is just one example of a property of an object that is to be compared against its counterpart object to verify synchronization.

The goal is to identifying mismatches where the data between the two data stores differs and needs correction. However, a mismatch at any given moment does not necessarily indicate a synchronization failure, as described above. Thus, the more that the data verification agent 110 can ignore mismatches that do not actually indicate a synchronization failure, the more efficient and effective is the operation of the agent 110. Accordingly, the data verification agent 110 includes a mismatch ignore function 118. As will be described in detail below, the mismatch ignore function 118 provides multiple techniques for avoiding addressing circumstances in which a mismatch between the data objects simply be an effect of the issues described above that will resolve in time without further attention.

Figure 2A:
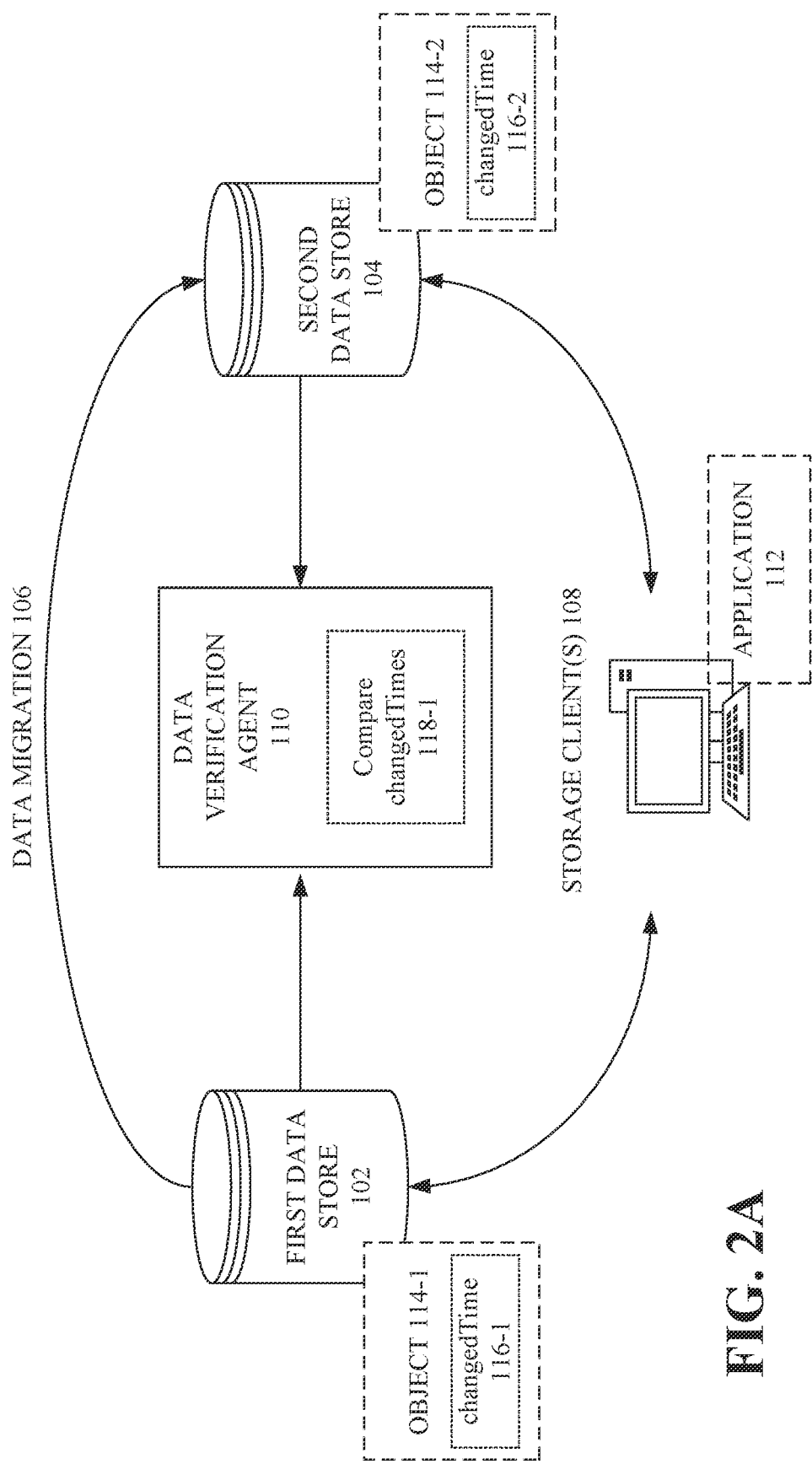
FIG. 2A depicts additional details in the illustrative system of FIG. 1A upon which aspects of this disclosure may be implemented.

FIG. 2A depicts additional details in the illustrative system of FIG. 1A upon which aspects of this disclosure may be implemented. One feature of the data verification agent 110, described herein, is the ability to use an object changed time to filter out consideration of objects that will show a mismatch simply because of migration or writing delay.

As shown in FIG. 2A the system will record a changedTime value 116 as a parameter of each data object in either of the data stores. The changedTime parameter specifies a time that the corresponding object was last changed, for example, as the result of a write command from the storage client 108. When the object 114 is created, edited or otherwise changed, the time of that event is recorded as the changedTime parameter of that object. Consequently, changedTime will always indicate the most recent change to the object.

Accordingly, the data verification agent 110 will include, as part of the mismatch ignore function, a function to compare the changedTimes 118-1. This function 118-1 will compare the changedTime parameter 116-1 of the first data object 114-1 with the changedTime parameter 116-2 of the second data object 114-2. This will be particularly useful during data migration to avoid comparing objects that will have a mismatch due simply to migration delay. This is illustrated in FIG. 2B.

Figure 2B:
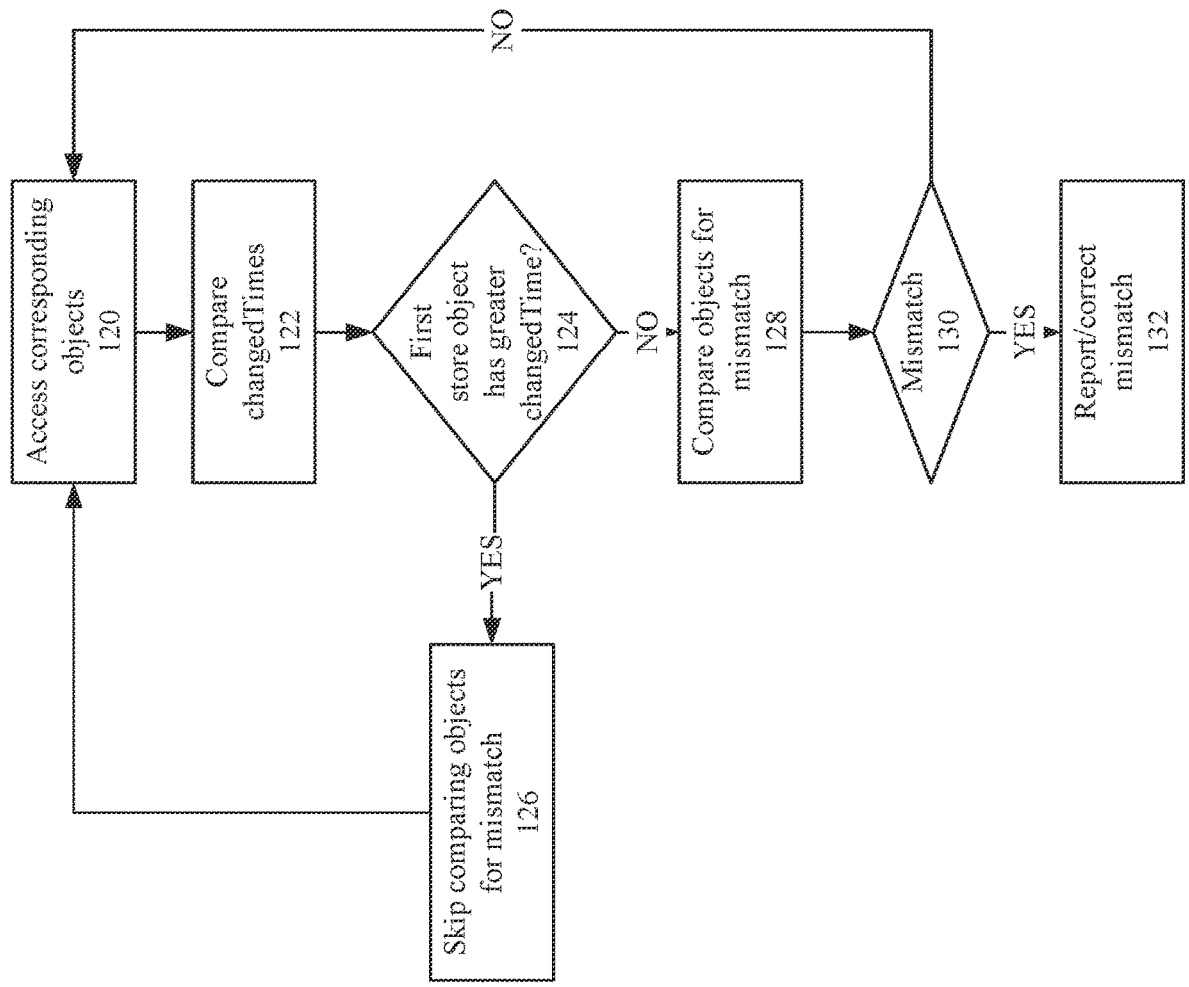
FIG. 2B is a flow diagram that depicts an illustrative operation of the system in FIG. 2A for verification of data across multiple data stores.

FIG. 2B is a flow diagram that depicts an illustrative operation of the system in FIG. 2A for verification of data across multiple data stores. During data migration, changedTime is migrated with objects from the first data store to the second data store as a regular property. Consequently, if an object that has a greater changedTime in the first data store than a corresponding object in the second data store, this indicates there have been additional changes in the object in the first data store that have not yet been synced to the corresponding object in the second data store. In this instance, the two objects will necessarily not match if compared.

Accordingly, as shown in FIG. 2B, the data verification agent will be comparing batches of corresponding objects from the two data stores. As part of each iteration, the agent will access corresponding objects 120 in respective data stores. The agent will then first compare the changedTime parameters 122 of the two objects. If the object from the first store has a greater changedTime 124, this indicates that changes to that object have been made that have not yet been migrated to the corresponding object in the second data store. Thus, the agent will skip comparing the two objects for a mismatch 126. Rather, the agent can immediately proceed to accessing 120 the next two objects being verified in the batch.

However, if the changedTime parameters are the same, the agent can proceed to compare the objects for a mismatch 128. If there is a mismatch 130, this then indicates a synchronization problem rather than a transient condition. As described above, the agent can then report or log the mismatch 132. In some systems, the agent may also apply a correction to the mismatch by updating the object from the second data store to match the object from the first data store.

After data migration, the situation changes. During dual store mode, changes may be written at different rates to the two different data stores. Consequently, it is not apparent when a change will be reflected in the respective data stores. In this case, reviewing the changedTime parameter of an object in the data stores does not determine which store has the most up-to-date version of the object. If one store applies changes significantly faster than the other, it is entirely possible for the other store to have an older version of an object but still have a more recent changedTime value because it just processed an older change most recently and is still a few changes behind.

Consequently, to avoid unnecessarily comparing objects that are only mismatched because of write delay, the data verification agent is to skip comparisons for objects that have been modified recently in either store. Specifically, the data verification agent will disregard and not compare an object pair if either object has a chagedTime parameter where UtcNow( )−changedTime<x, where x is a configurable value set to a reasonable time that is tolerant of the write delay in the system.

Figure 2C:
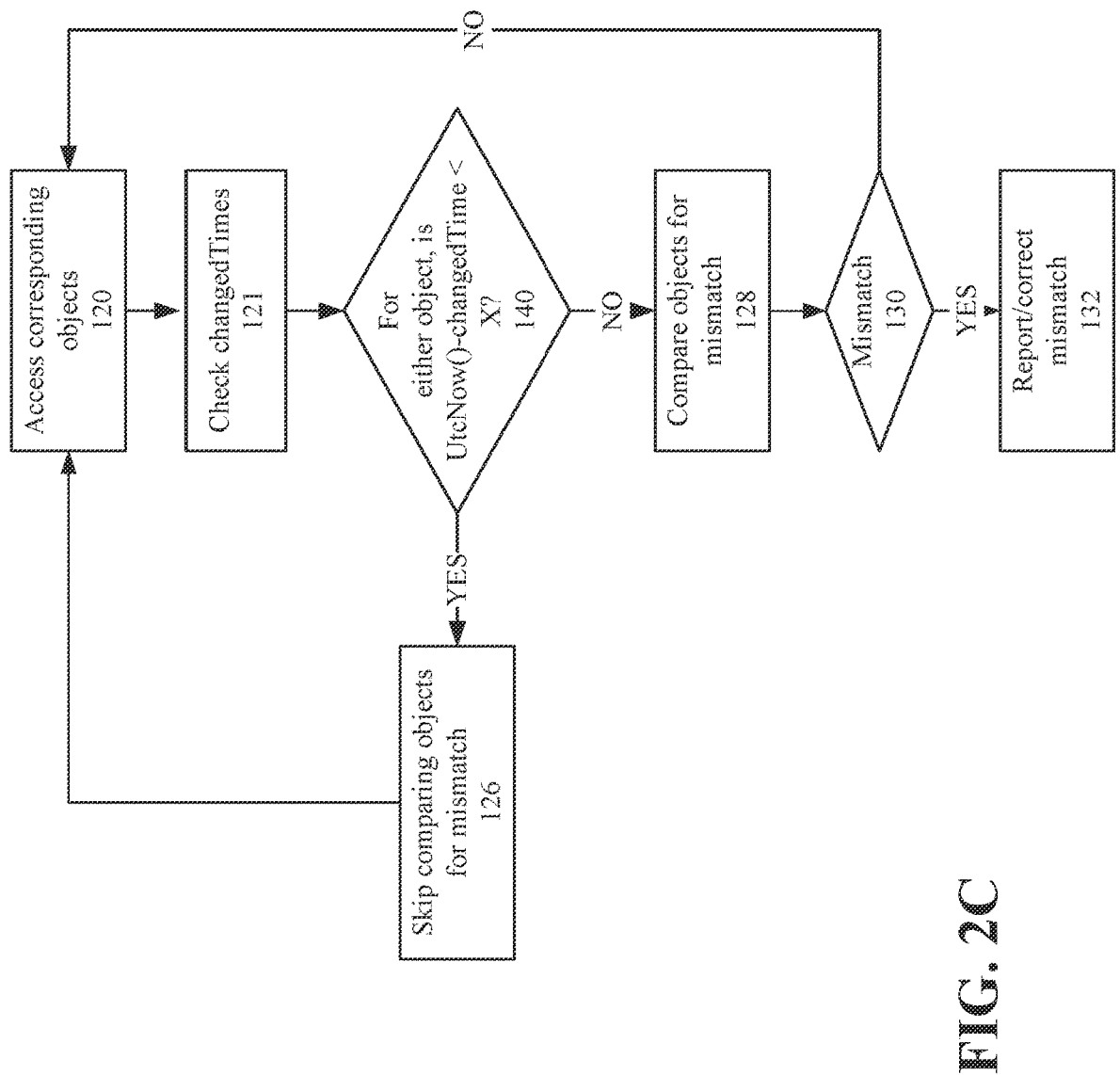
FIG. 2C is a flow diagram that depicts an alternative operation of the system in FIG. 2A for verification of data across multiple data stores.

This is illustrated in FIG. 2C. As shown in FIG. 2C, while verifying a batch of objects, the data verification agent will first access a corresponding pair of objects 120, respectively from the first and second data stores. The agent will then check the changedTime parameter 121 for both objects. If either object has recently been changed, this will be reflected in the changedTime parameter, e.g., where UtcNow( )−changedTime<x. If either object has a chagedTime within this window, the agent will skip comparing the objects for mismatch 126 and move on to the next pair of objects in the batch 120.

However, if neither object has a changedTime parameter within the window defined by "x," then the agent will proceed to compare the objects for a mismatch 128. If there is a mismatch 130, this indicates a synchronization failure. As described above, the agent can then report or log the mismatch 132. In some systems, the agent may also apply a correction to the mismatch by updating the object from the second data store to match the object from the first data store.

Figure 2D:
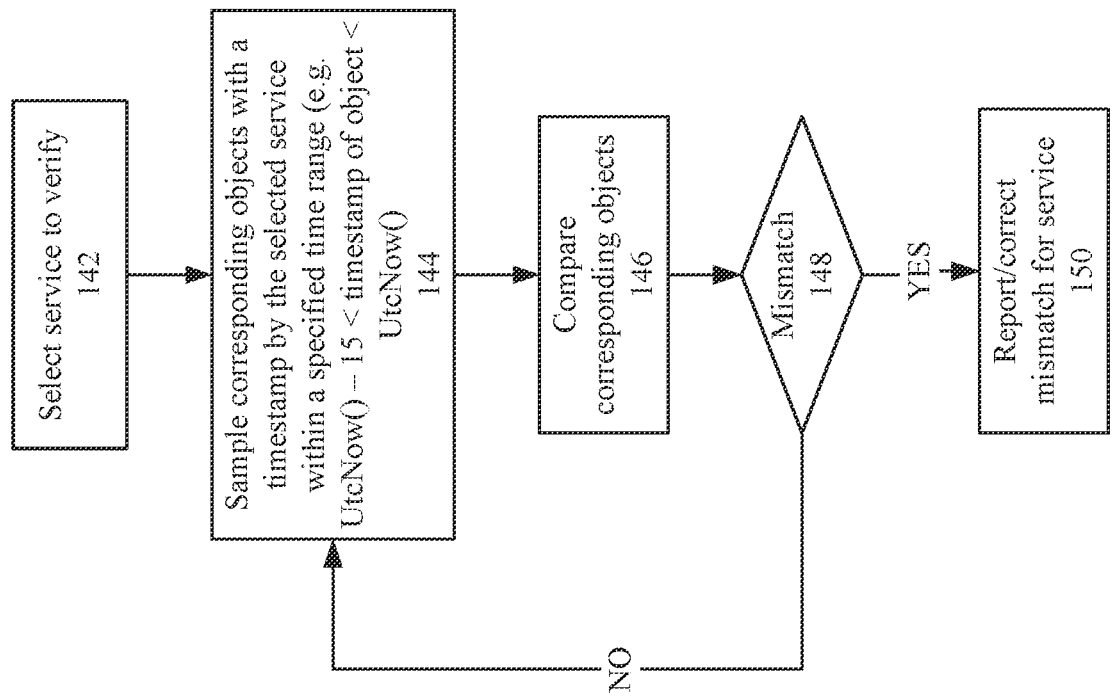
FIG. 2D is a flow diagram that depicts another alternative operation of the system in FIG. 2A for verification of data across multiple data stores.

FIG. 2D is a flow diagram that depicts another alternative operation of the system in FIG. 2A for verification of data across multiple data stores for a specific service on the storage client. Referring briefly to FIG. 1A, the storage client 108 will be executing an operating system and a number of applications 112 on that operating system. Within this environment, there are a number of specific services that might generate a write command to data stores. For example, an object provisioning service creates objects, an object update service updates existing object, and a token refresh service will refresh tokens. Each of these services will usually write a timestamp associated with the object that was serviced. This timestamp documents the time of the service.

Consequently, besides sampling randomly from the data stores to find mismatches by object comparison, the data verification agent can provide a time-based sampling method that allows the user to verify the data synchronization of objects affected by a specific service. Again, these services or "writers" to storage systems usually leave timestamps as traces behind a write operation. This includes, but is not limited to: object provisioning services leaving a created timestamp after the creation of the object, object update services leaving a changed timestamp after an update of the object, token refresh services leaving a token refresh time after a token is refreshed, etc.

During a time-based sampling mode, the data verification agent uses these timestamps as a filter. Specifically, the agent only samples objects that have timestamps by a specified service within a given time range. This allows the agent to look for objects modified by a specific service to verify data synchronization against that specific service. For example, if the user is interested in validating the correctness of the provisioning services, the agent can sample objects that were provisioned within the last 15 minutes by setting the time range to UtcNow( )−15<created time stamp of object<UtcNow( ). By verifying the objects that are most recently modified by a service, the data verification agent allows a user to isolate the writers of the storage system and validate against specific services.

This is illustrated in FIG. 2D. As shown in FIG. 2D, the user can select a specific service to verify 142 with a user interface of the data verification agent. The agent will then only sample 144 corresponding objects with a timestamp by the selected service within a specified time range (e.g. the previous 15 minutes: UtcNow( )−15<timestamp of object<UtcNow( )). The agent will then compare the corresponding objects 146 and determine the any mismatches 148. The mismatches identified can then be reported 150 to show, specifically, the data synchronization problems being experienced by the selected service. As noted in other examples, the data verification agent may also correct the mismatches.

Figure 2E:
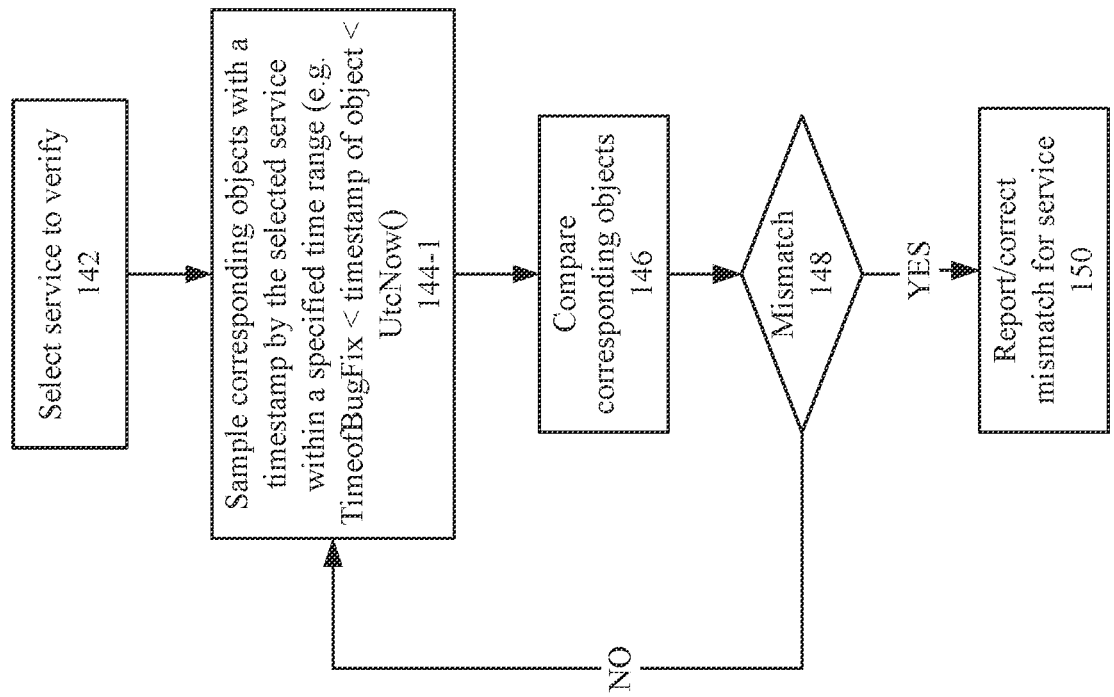
FIG. 2E is a flow diagram that depicts another alternative operation of the system in FIG. 2A for verification of data across multiple data stores.

FIG. 2E illustrates another use of time-based sampling. In FIG. 2E, time-based sampling is used for neglecting previous bugs. During a transition to a new storage system, it is quite common for the services or writers to be frequently modified for new features and bug fixes. Time based sampling allows the user to monitor a writer in a defined period after a change is deployed. By setting the time range to only sample objects after the deployed time of a bug fix, the data verification agent can neglect the old data that was contaminated by the bug and only sample the objects modified by a service after the bug fix. This will help the user to validate the bug fix as well as reduce the noise in the verification process.

As shown in FIG. 2E, the user can again select a specific service to verify 142 with a user interface of the data verification agent. The service may be selected because it is related to a bug fix that has been deployed. The agent will then only sample 144-1 corresponding objects with a timestamp by the selected service subsequent to a time at which the bug fix was deployed (e.g. TimeofBugFix<timestamp of object<UtcNow( ). The agent will then compare the corresponding objects 146 and determine the any mismatches 148. The mismatches identified can then be reported 150 to show, specifically, the data synchronization problems being experienced by the selected service. As noted in other examples, the data verification agent may also correct the mismatches.

Figure 3:
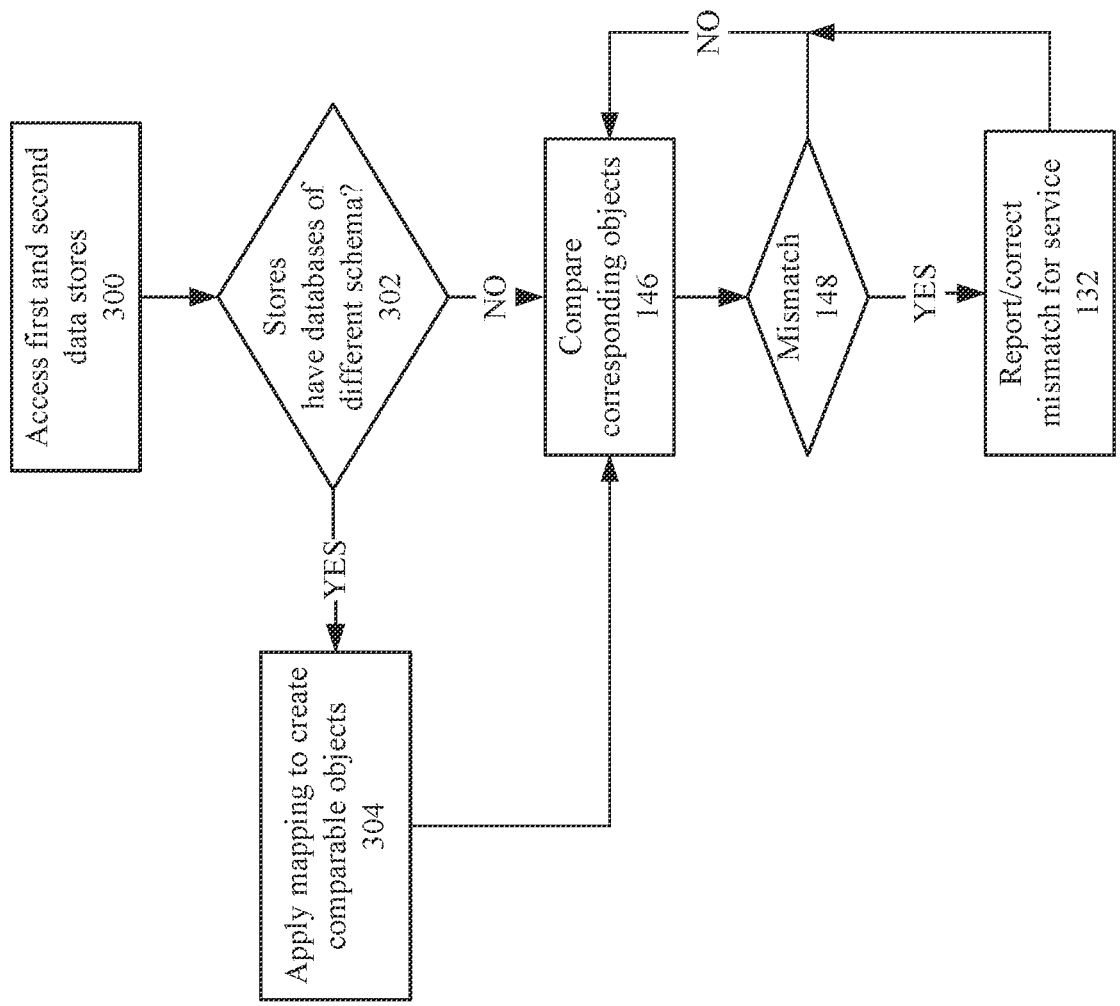
FIG. 3 is a flow diagram that depicts verification of data across multiple data stores with different storage schema.

FIG. 3 is a flow diagram that depicts verification of data across multiple data stores with different storage schema. The two different data stores may not store data in the same way. For example, one data store may have a tree structure with objects arranged in a hierarchy. Thus, objects will have a child/parent relationship with other objects. These relationships between the objects are a property of the objects. Alternatively, a second data store may have a table structure in which, from a storage perspective, each object is not dependent on the presence of another object. Each data object will have a number of properties that might be represented differently depending on the schema or structure of the data store.

For example, a new object being added to a database with a tree structure may not need a parent object. However, the database connects the object with a dummy parent object because of the schema of the database. If this object is later being verified against a corresponding object from a table database, the absence of the dummy parent object in the table database, i.e., any equivalent relationship, should not be considered a mismatch or synchronization issue. Rather, it is entirely a function of comparing objects between two databases of different schema.

A mapping layer can be prepared based on the standards for different schema in data stores to associate data object properties in one schema with their equivalent counterparts in the other schema. In the example above, the mapping layer can dictate that the relationship with the dummy parent object in the tree database object is not considered in the comparison, or a similar value for this property is written to both structures that are used for the comparison. This mapping layer can be used by the data verification agent to accurately compare data objects from the respective data stores for any mismatch, as described herein.

In one example, this mapping layer operates in C #. C #(C-Sharp) is a programming language developed by Microsoft that runs on the .NET Framework. This mapping layer encapsulates the data of the respective data store objects into a C #object. Properties of the data objects that were represented differently in the native schema of their respective data stores are then represented in the same fashion in the C #objects. Accordingly, the C #objects can then be readily compared by the data verification agent for any mismatch.

As shown in FIG. 3, the data verification agent will access the first and second data stores 300. The data verification agent will also need to determine if the databases of the first and second data stores are organized on different schema 302 and what those schema are. If the data stores are not of different schema, the data verification agent can proceed to compare corresponding objects 146 for any mismatch and note any mismatches 148. As in other examples described, mismatches can be logged or report and/or corrected 132. The data verification agent can then continue with additional object comparisons 146 until the batch is completed.

When it is determined that the data stores have different schema 302, the data verification agent will apply a mapping layer, as described above. The data verification agent may be provided with a number of different mapping layers that related each type of schema to each other possible schema type. The data verification agent selects the correct mapping layer matching the two schema identified for the first and second data stores. The data verification agent then applies this mapping 304 to the objects from the first and second data stores to generate a mapped object for each that is then readily comparable with the other. The data verification agent can then compare the mapped or encapsulated objects 146 and determine any mismatch 148.

Figure 4A:
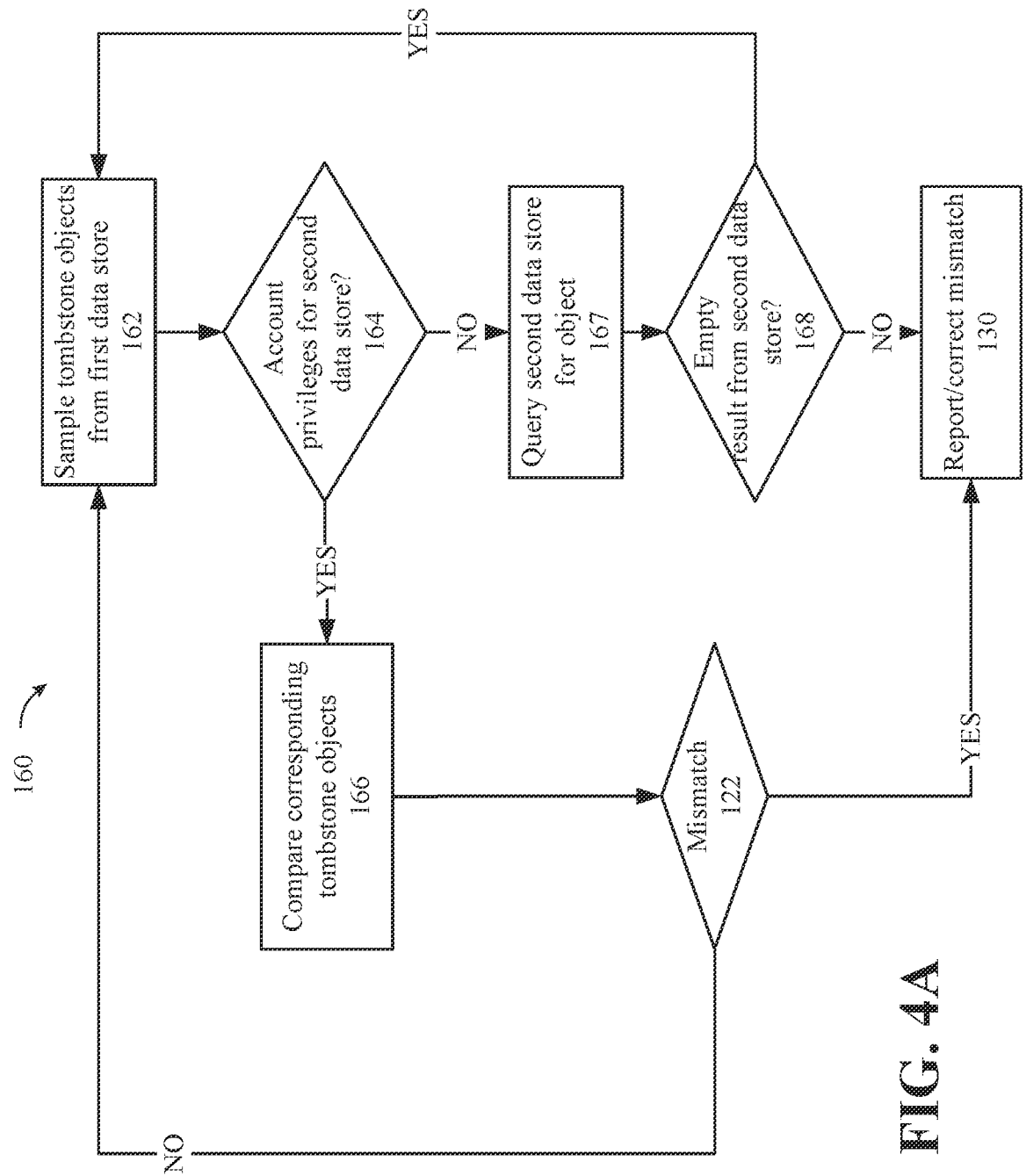
FIG. 4A is a flow diagram depicting an illustrative method for confirming data deletion across multiple data stores.

FIG. 4A is a flow diagram depicting an illustrative method for confirming data deletion across multiple data stores. As noted above, the data verification agent can verify that data deleted in one data store has also been deleted in the other data store. This is another important function in verifying the data matches between the multiple data stores.

In general, when an object is deleted, the deletion is marked with the creation of a tombstone object. More specifically, when an object is deleted, it is not immediately removed from the directory database. Instead, a special marker called the "tombstone" is added to the object, and the object is renamed and moved to a special container called the "Deleted Objects container." The tombstone object contains information about the original object, including its globally unique identifier (GUID) and the time of deletion.

The tombstone object is used by the replication process to ensure that all domain controllers eventually learn about the deletion of the object. When a domain controller replicates with another domain controller, it checks the tombstone objects in the "Deleted Objects" container to see if any objects need to be deleted on the local domain controller. Once the tombstone object has been replicated to all domain controllers in the domain, the object is finally removed during garbage collection from the directory store.

Consequently, as shown in FIG. 4A, the data verification agent can verify that data has been deleted in multiple data stores by sampling 162 tombstone objects from the first data store and comparing them to corresponding tombstone objects in the second data store. If both data stores are in the same form, e.g., an SQL database, this comparison is readily made.

However, in some instances one of the data stores may be in a different form, for example, an Active Directory (AD) database. As an alternative to Standard Query Language, (SQL), Active Directory (AD) is the directory service used by Microsoft Windows domain networks. Both AD and SQL use tombstone objects to mark objects as deleted. However, an AD database may require account privileges to query AD tombstone objects that the data verification agent lacks.

Consequently, after sampling 162 tombstone objects from the first data store, a check is conducted 164 as to whether the data verification agent has privileges to access tombstone objects in the second data store. If the data verification agent can access tombstone objects in the second data store, the agent can readily compare corresponding tombstone objects 166 and check for a mismatch between the tombstone objects 122. If the tombstone objects match, the deletion of the data unit across both data stores is verified, and the agent can proceed with the next comparison in the batch 162.

However, if the tombstone objects fail to match 122, the agent logs and/or reports the mismatch 130. As in other examples above, the agent may also correct the mismatch by deleting the data that remains undeleted in the second data store.

Alternatively, if the data verification agent does not have access to the tombstone objects in the second data store, the data verification agent will need another technique to verify that an object deleted in the first data store has also been deleted in the second data store. In this case, the data verification agent will query 167 the second data store for the object corresponding to the deleted object of the first data store. If that object has been deleted in the second data store, the second data store will return an empty result 168. If the second data store returns the empty result 168, deletion of the object in the second store is confirmed, and the agent can proceed with the next comparison in the batch 162. However, if the second data store does not return an empty result, the object deleted from the first data store has not been deleted from the second data store. In this case, the agent logs and/or reports the mismatch 130. As in other examples above, the agent may also correct the mismatch by deleting the data that remains undeleted in the second data store.

Figure 4B:
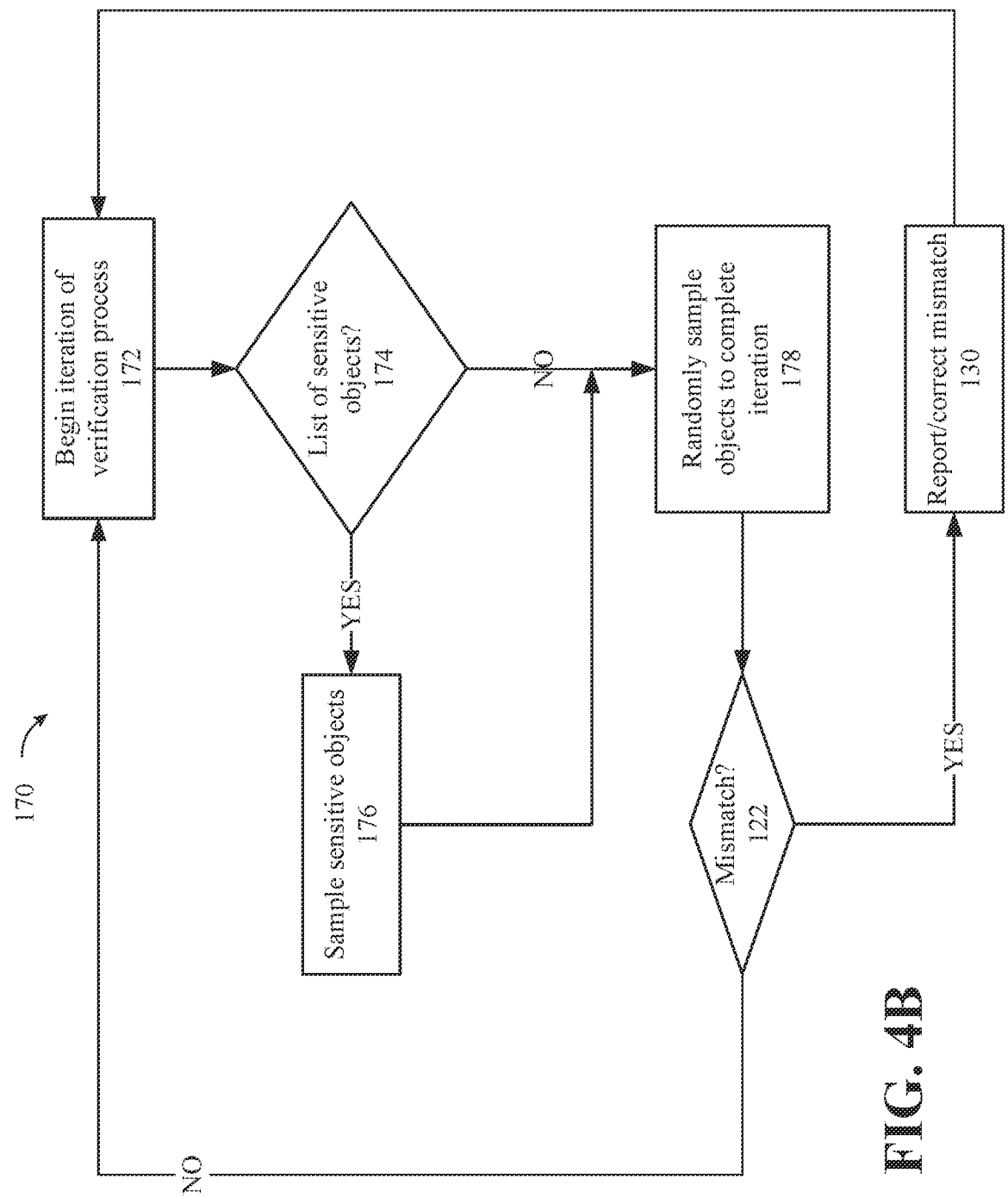
FIG. 4B is a flow diagram depicting an illustrative method for focusing on the verification of particularly sensitive data across multiple data stores.

FIG. 4B is a flow diagram depicting an illustrative method for focusing on the verification of particularly sensitive data across multiple data stores. Certain objects in a directory system are more sensitive or significant than others. For example, objects that are used and updated very frequently represent data that is particularly important to a user. In another example, objects that support the operation of key system features are also important because of their function. Given the nature of these objects, data verification between the copies of these objects may be more important than in other cases. In other examples, small subsets of objects within a particular class may be important. While the number of such objects in this set may be small (e.g., on the order of hundreds of objects amongst millions), the subset of objects can have a large impact on the overall data integrity and correctness of the read/write processes.

With random sampling for data verification between data stores, not enough of these sensitive objects may be selected to effectively track the data synchronization in proportion to the importance of these objects. Consequently, the data verification agent is adjusted to verify the objects in this set of sensitive objects with every batch or iteration of the verification process.

As noted above, the data verification agent will typically operate in a batched mode. For example, a data verification agent may sample objects in batches, such as 100 objects for each object type in one iteration. The data verification agent then compares each pair of corresponding the objects. When a mismatch is found, a mismatch log for that specific object will be created. At the end of an iteration, the data verification agent can log the metrics for the whole iteration such as the number objects checked and the number of objects that have mismatches.

Where a list of sensitive objects has been identified, the data verification agent will sample and verify synchronization of those objects with each iteration of the batch process. In this way, any lack of synchronization of these objects will be detected and can be corrected much more quickly in proportion to the importance of these sensitive objects.

As shown in FIG. 4B, the data verification agent because a new iteration of the verification process 172. If a list of sensitive objects has been established 174, the sensitive objects are sampled 176. Other objects may also be randomly sampled 178 within the limits of the iteration.

In both cases, sampling includes accessing corresponding sensitive objects in the first and second data stores, respectively. The sampled object pairs are checked 122 for any mismatch between the objects, as described in the preceding examples. As above, any mismatches are logged or reported 130. In some examples, the mismatches are corrected 130. Then, the next iteration of the data verification process 172 can begin. In this way, the sensitive objects are verified in each iteration of the data verification.

Figure 5:
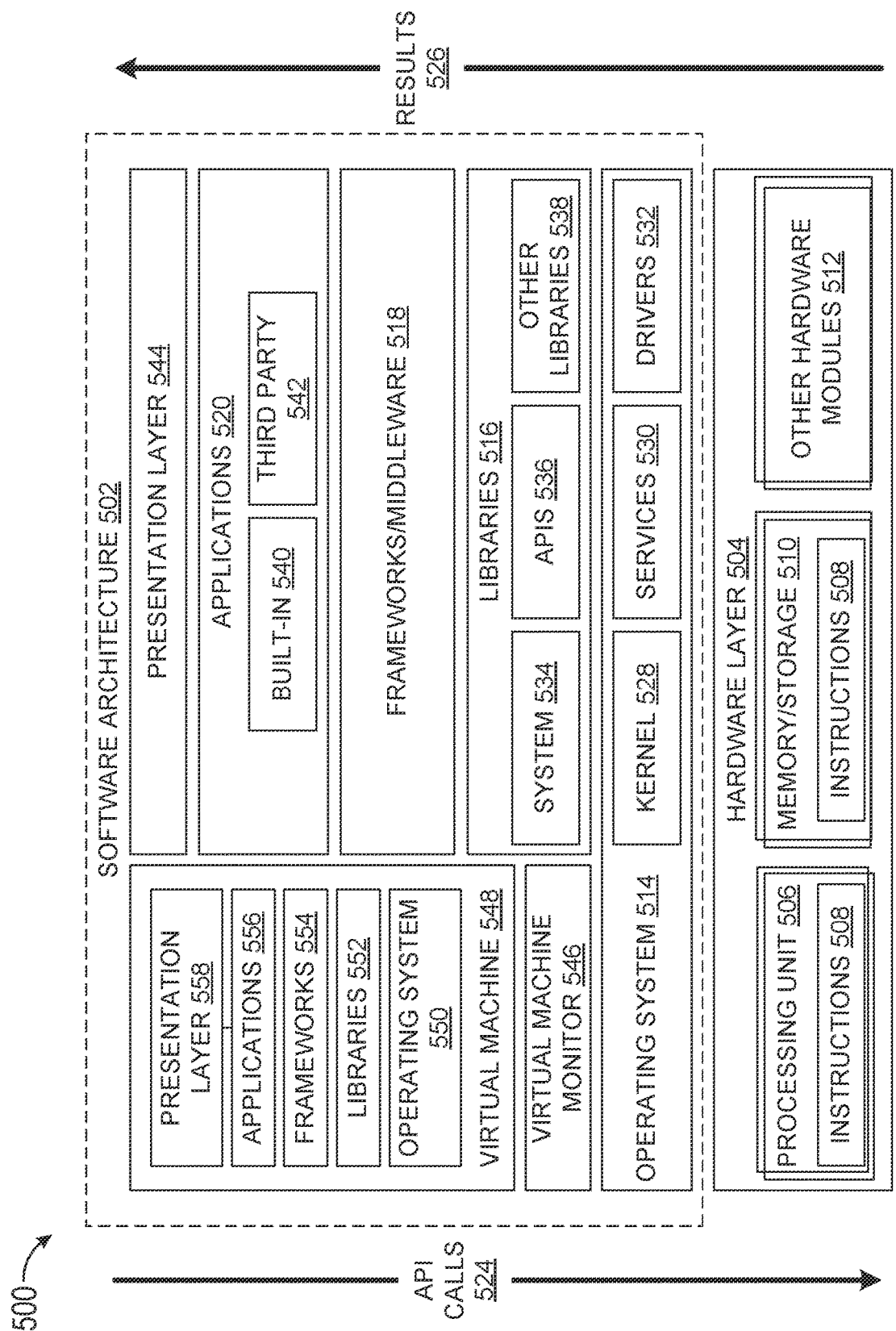
FIG. 5 is a block diagram illustrating an example software architecture, various portions of which may be used in conjunction with various hardware architectures herein described.

FIG. 5 is a block diagram 500 illustrating an example software architecture 502. This architecture could be implemented as the data verification agent described herein.

Various portions of this software architecture may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
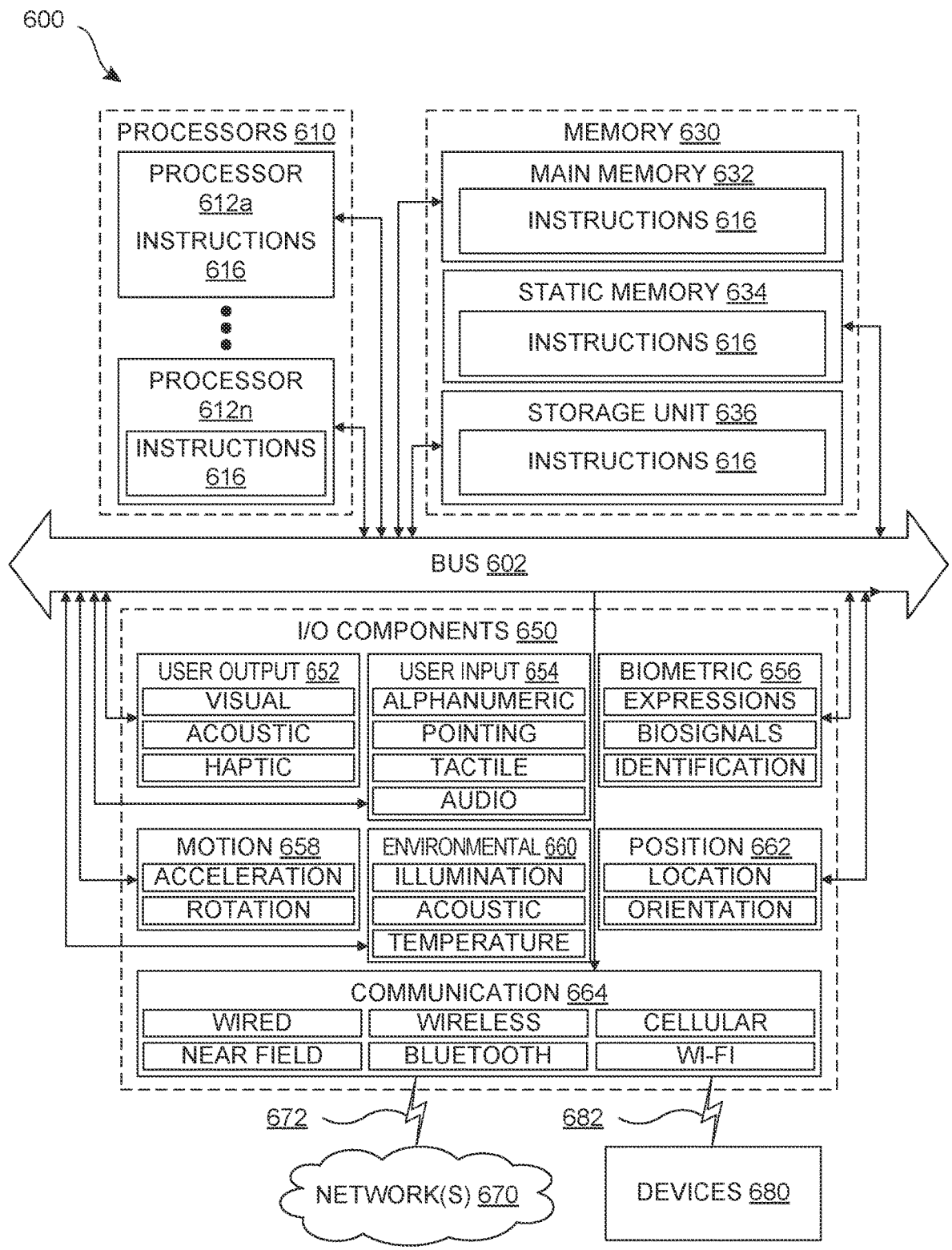
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. In one example, this machine 600 could be utilized as the server supporting the data verification agent described herein.

The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
- a processor;
- a memory comprising programming instructions for execution by the processor; and
- an interface for connecting to multiple data stores,
- the instructions, when executed by the processor, causing the processor to implement:
- a data verification agent to verify data that is being redundantly stored in both a first data store and a second data store, the data verification agent to compare corresponding objects in the first and second data stores to determine any mismatch between the objects;
- the data verification agent comprising a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

Item 2. The data processing system of Item 1, wherein the indication that the mismatch would not necessarily indicate a synchronization failure is determined based on a changedTime parameter of each of the objects.

Item 3. The data processing system of Item 1, wherein the data verification agent further provides synchronization verification on a per service basis,
- the data verification agent receiving selection of a specific service for which to verify data synchronization;
- the data verification agent sampling corresponding objects in the first and second data stores that have a timestamp by the selected service within a specified time range; and
- the data verification agent reporting mismatches between the objects of the first and second data stores that have a timestamp by the selected service within the specified time range.

Item 4. The data processing system of Item 1, wherein the data verification agent:
- applies a mapping layer to the corresponding objects from the first and second data stores when the first and second data stores are organized by different schema, the mapping layer producing mapped objects based on the data and properties of the objects from the first and second data stores; and
- compares the mapped objects for any mismatch.

Item 5. The data processing system of Item 1, wherein the data verification agent further confirms synchronous deletion of objects between the first and second data stores where the data verification agent does not have privileges for the second data store;
- the data verification agent to compare a tombstone object from the first data store with a corresponding empty result from the second data store; and
- the data verification agent to report a mismatch if the second data store does not return the empty result corresponding to the tombstone object from the first data store.

Item 6. The data processing system of Item 1, wherein the data verification agent performs data verification in a series of iterations, the data verification agent having a list of sensitive data objects which are sampled for possible mismatches between the first and second data stores in every iteration.

Item 7. A non-transitory computer-readable medium comprising instructions for a processor, the instructions, when executed by the processor, causing the processor to implement:
- a data verification agent to verify data that is being redundantly stored in both a first data store and a second data store, the data verification agent to compare corresponding objects in the first and second data stores to determine any mismatch between the objects;
- the data verification agent comprising a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

Item 8. The non-transitory computer-readable medium of Item 7, wherein the indication that the mismatch would not necessarily indicate a synchronization failure is determined based on a comparison of a changedTime parameter of each object, wherein, when the changedTime parameter of a first object in the first store is greater than a changedTime parameter of a corresponding second object in the second store, there is a positive indication that the mismatch would not necessarily indicate a synchronization failure and the mismatch is ignored by the data verification agent.

Item 9. The non-transitory computer-readable medium of Item 7, wherein the indication that the mismatch would not necessarily indicate a synchronization failure is determined based on a changedTime parameter of each object, wherein, when the changedTime parameter for either of two corresponding objects from the first and second data stores is within a preset recent time period, there is a positive indication that the mismatch would not necessarily indicate a synchronization failure and the mismatch is ignored by the data verification agent.

Item 10. The non-transitory computer-readable medium of Item 7, wherein the data verification agent further provides synchronization verification on a per service basis,
- the data verification agent receiving selection of a specific service for which to verify data synchronization;
- the data verification agent sampling corresponding objects in the first and second data stores that have a timestamp by the selected service within a specified time range; and
- the data verification agent reporting mismatches between the objects of the first and second data stores that have a timestamp by the selected service within the specified time range.

Item 11. The non-transitory computer-readable medium of Item 7, wherein the specified time range is a period of time since a bug fix was applied.

Item 12. The non-transitory computer-readable medium of Item 7, wherein the data verification agent:
- applies a mapping layer to the corresponding objects from the first and second data stores when the first and second data stores are organized by different schema, the mapping layer producing mapped objects based on the data and properties of the objects from the first and second data stores; and compares the mapped objects for any mismatch.

Item 13. The non-transitory computer-readable medium of Item 7, wherein the data verification agent further confirms synchronous deletion of objects between the first and second data stores,
  the data verification agent to compare corresponding tombstone objects between the first and second data stores; and
  the data verification agent to report any mismatch between the tombstone objects from the first and second data stores.

Item 14. The non-transitory computer-readable medium of Item 7, wherein the data verification agent further confirms synchronous deletion of objects between the first and second data stores where the data verification agent does not have privileges for the second data store;
  the data verification agent to compare a tombstone object from the first data store with a corresponding empty result from the second data store; and
  the data verification agent to report a mismatch if the second data store does not return the empty result corresponding to the tombstone object from the first data store.

Item 15. The non-transitory computer-readable medium of Item 7, wherein the data verification agent performs data verification in a series of iterations, the data verification agent having a list of sensitive data objects which are sampled for possible mismatches between the first and second data stores in every iteration.

Item 16. The non-transitory computer-readable medium of Item 15, wherein objects not listed as sensitive data objects are only randomly sampled for possible mismatches during the series of iterations.

Item 17. A method of verifying data being redundantly stored in both a first data store and a second data store while limiting false positive indications of data mismatch, the method comprising:
  operating a data verification agent to compare corresponding objects in the first and second data stores to determine any mismatch between the objects;
  skipping a comparison of corresponding data objects in the first and second data stores in response to an indication that a mismatch between the objects would not necessarily indicate a synchronization failure so as to minimize false positive determinations of a synchronization failure.

Item 18. The method of Item 17, wherein the indication that the mismatch would not necessarily indicate a synchronization failure is determined based on a changedTime parameter of each of the objects.

Item 19. The method of Item 17, further comprising:
  applying a mapping layer to the corresponding objects from the first and second data stores when the first and second data stores are organized by different schema, the mapping layer producing mapped objects based on the data and properties of the objects from the first and second data stores; and
  comparing the mapped objects for any mismatch.

Item 20. The method of Item 17, wherein the data verification agent further confirms synchronous deletion of objects between the first and second data stores where the data verification agent does not have privileges for the second data store;
  the data verification agent to compare a tombstone object from the first data store with a corresponding empty result from the second data store; and
  the data verification agent to report a mismatch if the second data store does not return the empty result corresponding to the tombstone object from the first data store.

Item 21. A non-transitory computer-readable medium comprising instructions for a processor, the instructions, when executed by the processor, causing the processor to implement:
  a data verification agent to verify data that is being redundantly stored in both a first data store and a second data store, the data verification agent to compare corresponding objects in the first and second data stores to determine any mismatch between the objects;
  wherein the data verification agent further provides synchronization verification on a per service basis,
  the data verification agent receiving selection of a specific service for which to verify data synchronization;
  the data verification agent sampling corresponding objects in the first and second data stores that have a timestamp by the selected service within a specified time range; and
  the data verification agent reporting mismatches between the objects of the first and second data stores that have a timestamp by the selected service within the specified time range.

Item 22. The non-transitory computer-readable medium of Item 21, wherein the data verification agent comprising a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

Item 23. A non-transitory computer-readable medium comprising instructions for a processor, the instructions, when executed by the processor, causing the processor to implement
  a data verification agent to verify data that is being redundantly stored in both a first data store and a second data store, the data verification agent to compare corresponding objects in the first and second data stores to determine any mismatch between the objects, wherein the data verification agent:
  applies a mapping layer to the corresponding objects from the first and second data stores when the first and second data stores are organized by different schema, the mapping layer producing mapped objects based on the data and properties of the objects from the first and second data stores; and
  compares the mapped objects for any mismatch.

Item 24. The non-transitory computer-readable medium of Item 23, wherein the data verification agent comprising a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

Item 25. A non-transitory computer-readable medium comprising instructions for a processor, the instructions, when executed by the processor, causing the processor to implement:
    a data verification agent to verify data that is being redundantly stored in both a first data store and a second data store, the data verification agent to compare corresponding objects in the first and second data stores to determine any mismatch between the objects;
    wherein the data verification agent further confirms synchronous deletion of objects between the first and second data stores when the data verification agent does not have privileges for the second data store;
    the data verification agent to compare a tombstone object from the first data store with a corresponding empty result from the second data store; and
    the data verification agent to report a mismatch if the second data store does not return the empty result corresponding to the tombstone object from the first data store.

Item 26. The non-transitory computer-readable medium of Item 25, wherein the data verification agent comprising a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

Item 27. A non-transitory computer-readable medium comprising instructions for a processor, the instructions, when executed by the processor, causing the processor to implement:
    a data verification agent to verify data that is being redundantly stored in both a first data store and a second data store, the data verification agent to compare corresponding objects in the first and second data stores to determine any mismatch between the objects;
    wherein the data verification agent performs data verification in a series of iterations, the data verification agent having a list of sensitive data objects which are sampled for possible mismatches between the first and second data stores in every iteration.

Item 28. The non-transitory computer-readable medium of Item 27, wherein the data verification agent comprising a mismatch ignore function causing the agent to skip a comparison of corresponding data objects in the first and second data stores in response to an indication that a mismatch between the objects would not necessarily indicate a synchronization failure so as to minimize false positive determinations of a synchronization failure.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of verifying data being redundantly stored in both a first data store and a second data store while limiting false positive indications of data mismatch, the method comprising:
synchronizing a plurality of data objects stored in the first and second data stores;
based on the plurality of data objects, determining, via a data verification agent, that the first and second data stores are each organized by different schema;
in response to the determination that the first and second data stores are each organized by different schema, applying a mapping layer to produce mapped objects based on data and properties of the data objects from the first and second data stores;
identifying, via the data verification agent, a plurality of corresponding mapped objects from the first and second data stores, wherein the corresponding mapped objects have data object properties in one schema with equivalent counterparts in another schema;
removing, by the data verification agent, mismatches caused by the first and second data stores being organized by different schema, wherein mismatches are removed when the mismatches are based on the equivalent counterparts in the one schema not being in the another schema; and
for each pair of the corresponding mapped objects:
determining whether the pair of corresponding mapped objects has a condition indicating that a data mismatch between the objects of the pair is indicative of a data synchronization failure;
in response to determining that the pair has the condition indicating that the data mismatch between the objects of the pair is indicative of the data synchronization failure:
comparing the corresponding mapped objects for data mismatch;
based on the comparison, identifying a data mismatch between the compared objects; and
in response to identifying the data mismatch between the compared objects, correcting the data mismatch based on the comparison.

2. The method of claim 1, wherein the data verification agent is executing in an electronic environment for conducting verification of synchronization between corresponding objects stored, respectively, in the first and second data stores.

3. The method of claim 1, further comprising skipping comparison of the objects of a pair of corresponding mapped objects for data mismatch if the pair does not have the condition indicating that a data mismatch between the objects of the pair is indicative of the data synchronization failure.

4. A system for verifying data that is redundantly stored in both a first data store and a second data store, the system comprising:
a processor;
a memory comprising programming instructions for execution by the processor; and
an interface for connecting to multiple data stores;
the programming instructions, when executed by the processor, causing the system to perform operations comprising:
synchronizing a plurality of data objects stored in the first and second data stores;
based on the plurality of data objects, determining, via a data verification agent, that the first and second data stores are each organized by different schema;
in response to the determination that the first and second data stores are each organized by different schema, applying a mapping layer to produce mapped objects based on data and properties of the data objects from the first and second data stores;
identifying, via the data verification agent, a plurality of corresponding mapped objects from the first and second data stores, wherein the corresponding mapped objects have data object properties in one schema with equivalent counterparts in another schema;
removing, by the data verification agent, mismatches caused by the first and second data stores being organized by different schema, wherein mismatches are removed when the mismatches are based on the equivalent counterparts in the one schema not being in the another schema; and
for each pair of the corresponding mapped objects:
determining whether the pair of corresponding mapped objects has a condition indicating that a data mismatch between the objects of the pair is indicative of a data synchronization failure;
in response to determining that the pair has the condition indicating that the data mismatch between the objects of the pair is indicative of the data synchronization failure:
comparing the corresponding mapped objects for data mismatch;
based on the comparison, identifying a data mismatch between the compared objects; and
in response to identifying the data mismatch between the compared objects, correcting the data mismatch based on the comparison.

5. The system of claim 4, further comprising programming instructions that, when executed by the processor, cause the system to perform operations comprising generating an indication that the data mismatch would not indicate a synchronization failure based on a changedTime parameter of the data objects.

6. The system of claim 4, further comprising programming instructions that, when executed by the processor, cause the system to perform operations comprising:
receiving a selection of a specific service for which to verify data synchronization;
sampling corresponding objects in the first and second data stores that have a timestamp by the selected service within a specified time range; and
reporting mismatches between the objects of the first and second data stores that have a timestamp by the selected service within the specified time range.

7. The system of claim 4, further comprising programming instructions that, when executed by the processor, cause the system to perform operations comprising:
comparing a tombstone object from the first data store with a corresponding empty result from the second data store; and
reporting a mismatch if the second data store does not return the empty result corresponding to the tombstone object from the first data store.

8. The system of claim 4, further comprising programming instructions that, when executed by the processor, cause the system to perform operations comprising performing data verification in a series of iterations, wherein a list of sensitive data objects are sampled for possible mismatches between the first and second data stores in each of the iterations.

9. A non-transitory computer-readable medium comprising instructions for verifying data redundantly stored in both a first data store and a second data store, the instructions, when executed by a processor, cause a computing device to perform operations comprising:
synchronizing a plurality of data objects stored in first and second data stores;
based on the plurality of data objects, determining, via a data verification agent, that the first and second data stores are each organized by different schema;
in response to the determination that the first and second data stores are each organized by different schema, applying a mapping layer to produce mapped objects based on data and properties of the data objects from the first and second data stores;
identifying, via the data verification agent, a plurality of corresponding mapped objects from the first and second data stores, wherein the corresponding mapped objects have data object properties in one schema with equivalent counterparts in another schema;
removing, by the data verification agent, mismatches caused by the first and second data stores being organized by different schema, wherein mismatches are removed when the mismatches are based on the equivalent counterparts in the one schema not being in the another schema; and
for each pair of the corresponding mapped objects:
determining whether the pair of corresponding mapped objects has a condition indicating that a data mismatch between the objects of the pair is indicative of a data synchronization failure;
in response to determining that the pair has the condition indicating that the data mismatch between the objects of the pair is indicative of the data synchronization failure:
comparing the corresponding mapped objects for data mismatch;
based on the comparison, identifying a data mismatch between the compared objects; and
in response to identifying the data mismatch between the compared objects, correcting the data mismatch based on the comparison.

10. The non-transitory computer-readable medium of claim 9, further comprising instructions that, when executed by the processor, cause the computing device to perform operations comprising generating an indication that the data mismatch would not indicate a synchronization failure based on a comparison of a changedTime parameter of the data objects, wherein when the changedTime parameter of a first object in the first data store is greater than a changedTime parameter of a corresponding second object in the second data store, a positive indication is generated that the mismatch would not indicate the synchronization failure and the mismatch is ignored.

11. The non-transitory computer-readable medium of claim 9, further comprising instructions that, when executed by the processor, cause the computing device to perform operations comprising generating an indication that the data mismatch would not indicate a synchronization failure based on a changedTime parameter of each data object, wherein when the changedTime parameter for either of two corresponding objects from the first and second data stores is within a preset recent time period, a positive indication is generated that the mismatch would not indicate a synchronization failure and the mismatch is ignored.

12. The non-transitory computer-readable medium of claim 9, further comprising instructions that, when executed by the processor, cause the computing device to perform operations comprising:
receiving selection of a specific service for which to verify data synchronization;
sampling corresponding objects in the first and second data stores that have a timestamp by the selected service within a specified time range; and
reporting mismatches between the objects of the first and second data stores that have a timestamp by the selected service within the specified time range.

13. The non-transitory computer-readable medium of claim 12, wherein the specified time range is a period of time since a bug fix was applied.

14. The non-transitory computer-readable medium of claim 9, further comprising instructions that, when executed by the processor, cause the computing device to perform operations comprising:
comparing corresponding tombstone objects between the first and second data stores; and
reporting any mismatch between the tombstone objects from the first and second data stores.

15. The non-transitory computer-readable medium of claim 9, further comprising instructions that, when executed by the processor, cause the computing device to perform operations comprising:
comparing a tombstone object from the first data store with a corresponding empty result from the second data store; and
reporting a mismatch if the second data store does not return the empty result corresponding to the tombstone object from the first data store.

16. The non-transitory computer-readable medium of claim 9, further comprising instructions that, when executed by the processor, cause the computing device to perform operations comprising:
performing data verification in a series of iterations, wherein a list of sensitive data objects are sampled for possible mismatches between the first and second data stores in each of the iterations.

17. The non-transitory computer-readable medium of claim 16, wherein objects not listed as sensitive data objects are only randomly sampled for possible mismatches during the series of iterations.

* * * * *